(12) United States Patent
Chatham et al.

(10) Patent No.: US 11,479,082 B2
(45) Date of Patent: Oct. 25, 2022

(54) SYSTEM AND METHOD FOR REFRIGERANT MANAGEMENT IN AN ELECTRIC VEHICLE

(71) Applicant: JAGUAR LAND ROVER LIMITED, Coventry (GB)

(72) Inventors: Chris Chatham, Coventry (GB); Dhillip Asokan, Coventry (GB); Kate Rouse, Coventry (GB); Oliver Stocks, Coventry (GB); Gael Chouchelamane, Coventry (GB); Richard Cook, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 165 days.

(21) Appl. No.: 16/970,352

(22) PCT Filed: Jan. 21, 2019

(86) PCT No.: PCT/EP2019/051404
§ 371 (c)(1),
(2) Date: Aug. 15, 2020

(87) PCT Pub. No.: WO2019/158317
PCT Pub. Date: Aug. 22, 2019

(65) Prior Publication Data
US 2021/0086586 A1    Mar. 25, 2021

(30) Foreign Application Priority Data

Feb. 16, 2018   (GB) ...................................... 1802560

(51) Int. Cl.
*B60H 1/00* (2006.01)
*B60H 1/32* (2006.01)
(Continued)

(52) U.S. Cl.
CPC ..... *B60H 1/00899* (2013.01); *B60H 1/00007* (2013.01); *B60H 1/00278* (2013.01);
(Continued)

(58) Field of Classification Search
CPC ............ B60H 1/00899; B60H 1/00278; B60H 1/00328; B60H 1/00342; B60H 1/00385;
(Continued)

(56) References Cited

U.S. PATENT DOCUMENTS

| 3,421,339 A | * | 1/1969 | Volk ........................ F25B 13/00 62/428 |
| 4,342,200 A | * | 8/1982 | Lowi, Jr. ................... F01P 9/06 60/599 |

(Continued)

FOREIGN PATENT DOCUMENTS

| DE | 102013021360 A1 | 6/2015 |
| DE | 102016008743 B3 | 10/2017 |
| WO | WO2019007558 A1 | 1/2019 |

OTHER PUBLICATIONS

Combined Search and Examination Report corresponding to GB Application No. GB 1802560.1, dated Jul. 27, 2018, 6 pages.
International Search Report corresponding to Intentional Application No. PCT/EP2019/051404, dated May 23, 2019, 3 pages.
Written Opinion corresponding to Intentional Application No. PCT/EP2019/051404, dated May 23, 2019, 7 pages.

*Primary Examiner* — Ljiljana V. Ciric
(74) *Attorney, Agent, or Firm* — Reising Ethington P.C.

(57) ABSTRACT

A refrigerant management system in a heat flux management system for an electric vehicle and a method of refrigerant management is provided. The system includes a vehicle air conditioning circuit including a heat pump circuit and a refrigeration cycle refrigerant circuit, the air conditioning circuit including a heat pump condenser in thermal communication with a heat source, a refrigerant evaporator in thermal communication with the heat source, an evaporator associated with an expansion valve, and a refrigerant com-
(Continued)

pressor where the components are fluidly connected to one another by a refrigerant line. An accumulator is fluidly coupled in the refrigerant line downstream of the heat pump condenser, the refrigerant evaporator and evaporator and upstream of the refrigerant compressor, and the air conditioning circuit is switchable between a heating mode and a cooling mode in which the refrigerant circuit is in fluid communication with the compressor by actuation of at least one valve.

19 Claims, 6 Drawing Sheets

(52) U.S. Cl.
CPC ..... *B60H 1/00328* (2013.01); *B60H 1/00342* (2013.01); *B60H 1/00385* (2013.01); *B60H 1/00392* (2013.01); *B60H 1/00428* (2013.01); *B60H 1/00492* (2013.01); *B60H 1/00778* (2013.01); *B60H 1/00907* (2013.01); *B60H 1/00921* (2013.01); *B60H 1/00978* (2013.01); *B60H 1/322* (2013.01); *B60H 2001/00307* (2013.01); *B60H 2001/00928* (2013.01); *B60H 2001/00949* (2013.01); *B60H 2001/325* (2013.01); *B60H 2001/3252* (2013.01); *B60H 2001/3257* (2013.01); *B60H 2001/3258* (2013.01); *B60H 2001/3263* (2013.01)

(58) Field of Classification Search
CPC ........... B60H 1/00392; B60H 1/00428; B60H 1/00492; B60H 1/00778; B60H 1/00907; B60H 1/00978; B60H 1/322; B60H 1/00007; B60H 1/00921; B60H 2001/00307; B60H 2001/00928; B60H 2001/00949; B60H 2001/325; B60H 2001/3252; B60H 2001/3257; B60H 2001/3258; B60H 2001/326
See application file for complete search history.

(56) References Cited

U.S. PATENT DOCUMENTS

| | | | | |
|---|---|---|---|---|
| 5,245,836 | A * | 9/1993 | Lorentzen | F25B 40/00 62/503 |
| 5,301,515 | A * | 4/1994 | Iritani | B60H 1/00392 62/126 |
| 5,410,889 | A * | 5/1995 | Sjoholm | F25B 49/02 62/196.2 |
| 5,560,217 | A * | 10/1996 | Takahashi | B60H 1/00921 62/200 |
| 5,596,878 | A * | 1/1997 | Hanson | B60H 1/00007 62/238.7 |
| 5,641,016 | A * | 6/1997 | Isaji | B60H 1/00921 165/43 |
| 6,003,325 | A | 12/1999 | Kurahashi et al. | |
| 7,028,501 | B2 * | 4/2006 | Casar | B60H 1/00899 165/240 |
| 7,231,776 | B2 * | 6/2007 | Casar | F25B 9/008 165/41 |
| 9,819,063 | B2 * | 11/2017 | Blatchley | B60H 1/00385 |
| 10,538,143 | B2 * | 1/2020 | Tsunoda | B60H 1/00885 |
| 10,752,092 | B2 * | 8/2020 | Choi | B60H 1/3213 |
| 11,199,349 | B2 * | 12/2021 | Pirmez | F25B 31/006 |
| 2005/0034473 | A1 * | 2/2005 | Casar | F25B 9/008 62/324.1 |
| 2006/0123824 | A1 * | 6/2006 | Casar | F25B 9/008 62/324.1 |
| 2012/0261110 | A1 * | 10/2012 | Katoh | F28F 9/0246 165/140 |
| 2013/0219939 | A1 | 8/2013 | Eisenhour | |
| 2014/0020415 | A1 * | 1/2014 | Heyl | B60H 1/00385 62/119 |
| 2014/0026831 | A1 * | 1/2014 | Mahrs | F01P 7/04 123/41.12 |
| 2014/0041826 | A1 * | 2/2014 | Takeuchi | B60L 1/08 165/10 |
| 2017/0054188 | A1 * | 2/2017 | Blatchley | H01M 10/663 |

* cited by examiner

SYSTEM AND METHOD FOR REFRIGERANT MANAGEMENT IN AN ELECTRIC VEHICLE

TECHNICAL FIELD

The present disclosure relates to a refrigerant management system and particularly, but not exclusively, to refrigerant management system for a heat flux management system of an electric vehicle. Aspects of the invention relate to a refrigerant management system, to a heat flux management system including the refrigerant management system, to a vehicle, and to a method of refrigerant management, where a refrigerant management system, a heat flux management system including the refrigerant management system, a vehicle, and a method of refrigerant management are the subjects of each the independent claims.

BACKGROUND

Heat flux management systems in electric vehicles comprise an air conditioning circuit including a heat pump circuit with a heating function and a vapour compression cycle refrigerant circuit each circuit being fluidly coupled to a compressor via a refrigerant line or conduit.

The refrigerant line carries a multi-phase fluid (e.g. refrigerant) through both the heating circuit and the refrigeration circuit. In such a split volume system, when the system is idle, the refrigerant fluid will tend to pool in a coldest part of the system. When the system is started and the refrigerant compressor first operated after a period of being idle, if the refrigerant has pooled away from the compressor such as may happen in cold ambient conditions, there may be insufficient refrigerant volume to operate the compressor when the heat pump circuit is engaged. In such circumstances, the compressor is in danger of failure.

The invention applies to pure electric vehicles and improves refrigerant management after prolonged compressor inactivity. The invention applies particularly when ambient temperatures are low.

It is an aim of the invention to improve refrigerant management in a heat flux management system.

It is an object of embodiments of the invention to at least mitigate one or more of the problems of the prior art.

SUMMARY OF THE INVENTION

Aspects and embodiments of the invention provide a refrigerant management system, a heat flux management system including the refrigerant management system, a vehicle, and a method of refrigerant management as claimed in the appended claims.

According to an aspect of the invention, there is provided a refrigerant management system in a heat flux management system for an electric vehicle, including a vehicle air conditioning circuit including a heat pump circuit with a heating function and a refrigeration cycle refrigerant circuit, the heat pump circuit including a condenser downstream of a refrigerant compressor and in thermal communication with a heat sink;

the refrigeration cycle refrigerant circuit including a condenser in fluid communication with the compressor;

wherein the air conditioning circuit is switchable between a heating mode in which the heat pump circuit is in fluid communication with the compressor and the condenser is isolated from fluid communication with the compressor and a cooling mode wherein the refrigerant circuit is in fluid communication with the compressor;

wherein the air conditioning circuit comprises a sensor at the compressor inlet operable to monitor refrigerant temperature and pressure; and wherein when the system is in the heating mode, a valve between the condenser and the compressor is operable to open to initiate a cold start mode in which a temporary fluid communication is provided between the condenser and the compressor in the heat pump circuit when:

the sensor detects one or both of: a superheated refrigerant at the compressor inlet and a temperature gradient of more than 3 Kelvin between ambient and the compressor inlet According to an aspect of the invention, there is provided a refrigerant management system in a heat flux management system for an electric vehicle, including a vehicle air conditioning circuit including a heat pump circuit with a heating function and a refrigeration cycle refrigerant circuit, the air conditioning circuit including a heat pump condenser in thermal communication with a heat source, a evaporator (e.g. refrigerant evaporator) in thermal communication with the heat source, an evaporator associated with an expansion valve, and a refrigerant compressor, wherein the components are fluidly connected to one another by a refrigerant line, an accumulator fluidly coupled in the refrigerant line downstream of the heat pump condenser, the refrigerant evaporator and evaporator and upstream of the refrigerant compressor, the heat pump circuit including an indirect condenser downstream of the refrigerant compressor and in thermal communication with a heat sink and the evaporator (e.g. refrigerant evaporator) (25) and the evaporator (31) in fluid communication with the refrigerant compressor (11) and the indirect condenser;

the refrigeration cycle refrigerant circuit (6) including the heat pump condenser (17) in fluid communication with the compressor (11);

wherein the air conditioning circuit is switchable between a heating mode in which the heat pump circuit (4) is in fluid communication with the compressor (11) and the heat pump condenser (17) is isolated from fluid communication with the compressor (11) and a cooling mode wherein the refrigerant circuit (6) is in fluid communication with the compressor by actuation of at least one valve (15, 21, 41, 47);

wherein the air conditioning circuit comprises a sensor (39) at the compressor inlet (239) operable to monitor refrigerant temperature and pressure; and wherein when the system is in the heating mode, a shut off valve 41 in line between the heat pump condenser (17) and the accumulator (37) is operable to open to initiate a cold start mode in which a temporary fluid communication is provided between the heat pump condenser (17) and the accumulator in the heat pump circuit when:

the sensor (39) detects one or both of: a superheated refrigerant at the compressor inlet (239) and a temperature gradient of more than 3 Kelvin between ambient (T3) and the compressor inlet (239).

In certain embodiments, the presence of an accumulator allows for control of vapour quality in the system.

In certain embodiments, the heat pump condenser the refrigerant evaporator and the evaporator are each associated with at least one valve. More specifically, each of the heat pump condenser, the refrigerant evaporator and the evaporator have at least one associated valve downstream thereof.

In certain embodiments, the compressor is associated with at least one valve. More specifically, the compressor has at least one associated valve downstream of the compressor outlet. Yet more specifically, the at least one associated valve downstream of the compressor outlet is one or more of: a three way valve, a shut off valve and a plurality of shut off valves.

In certain embodiments the at least one valve is associated with the outlet of the compressor and is operable to switch the outlet of the compressor into fluid communication with the heat pump circuit or the refrigeration cycle refrigerant circuit in the heat mode or the cooling mode respectively.

In certain embodiments the at least one valve associated with the compressor and at least one valve associated with the heat pump condenser are operable to switch the system from the heating mode to the cooling mode.

In certain embodiments wherein the at least one associated valve downstream of the compressor outlet is two shut off valves, the valves are operable to switch the outlet of the compressor into fluid communication with the heat pump circuit or the refrigeration cycle refrigerant circuit in the heat mode or the cooling mode respectively. More specifically, in the cooling mode, one of the associated valves is open to allow fluid communication between the outlet of the compressor and the heat pump condenser and the other of the associated valves is closed preventing fluid communication between the outlet of the compressor and the thermodynamic cycler in the heat pump circuit and in the heating mode, one of the associated valves is closed to prevent fluid communication between the outlet of the compressor and the heat pump condenser and the other of the associated valves is open to allow fluid communication between the outlet of the compressor and the thermodynamic cycler in the heat pump circuit.

In certain embodiments, in the heating mode, the heat pump condenser is fluidly isolated from the compressor by actuation of at least two valves. More specifically, the at least two valves isolate the heat pump condenser from the heat pump circuit.

In certain embodiments, in the heating mode, the heat pump condenser is fluidly isolated from the compressor by closure of at least two valves one valve associated with the inlet and one valve associated with the outlet of the heat pump condenser.

In certain embodiments, in the heating mode, the heat pump condenser is fluidly isolated from the inlet and the outlet of the compressor.

In certain embodiments, in the heating mode, the heat pump condenser is fluidly isolated from the refrigerant evaporator and the evaporator (if present), and the refrigerant compressor.

In certain embodiments, in the heating mode, the heat pump condenser is isolated from the outlet of the compressor by closing a shut off valve downstream of the compressor and from refrigerant evaporator and the evaporator by closing an associated expansion valve downstream of the heat pump condenser and from the accumulator by closing the shut off valve upstream of the accumulator and downstream of the heat pump condenser.

In certain embodiments, in the heating mode, the heat pump condenser is isolated from the heat pump circuit by closing at least one valve at the outlet of the compressor.

In certain embodiments, in the cooling mode, the heat pump condenser is in fluid communication with the compressor.

In certain embodiments, the cooling mode, the heat pump condenser is in fluid communication with the outlet of the compressor, the accumulator and with the refrigerant evaporator by actuation of a plurality of associated valves. More specifically, the plurality of valves are in the refrigeration cycle refrigerant circuit and are all open. Yet more specifically, when the valve downstream of the compressor and upstream of the heat pump condenser is open, the valve between the outlet of the compressor and the heat pump circuit is closed.

In certain embodiments, the shut off valve in line between the heat pump condenser and the accumulator is closed in the cold start mode when the sensor detects one or both of: a non-superheated refrigerant at the compressor inlet and a temperature gradient equal to or less than 3 Kelvin between ambient and the compressor inlet. In this way, once the conditions for initiating the cold start mode are no longer detected by the system, the valve allowing reverse refrigerant flow between the heat pump condenser and the accumulator (or compressor) is closed. The system is then ready for operation in either the heating or the cooling mode as required. If the inlet to the compressor is warmer than ambient (e.g. the ambient air around the system), or at least less than 3 Kelvin colder, the refrigerant in the system is likely to have moved or pooled in the heat pump condenser (or the heat pump condenser and the evaporator/dehumidifier). If the compressor were to be actuated, there may be insufficient refrigerant at the compressor to prevent damage or failure of the compressor. In effect, in such an environment, the refrigerant is stuck in the components of the system closest to the ambient environment. The refrigerant management system of the invention is operable to initiate the cold start mode to move refrigerant in a temporary reverse flow from the heat pump condenser or the accumulator (or the compressor). Thereafter, the heating or the cooling mode can be initiated without danger of damage or failure of the compressor.

In certain embodiments, the cold start mode is can be initiated prior to initiation of the heating mode.

In certain embodiments, the cold start mode is can be initiated after the system has been in cooling mode followed by a period of being idle. In this way, refrigerant trapped in the outside of the system can be redistributed to the compressor (or to the accumulator, if present).

In certain embodiments, the compressor is operable to draw a reverse flow of refrigerant from the heat pump condenser to the accumulator (or the compressor) in the cold start mode.

In certain embodiments, the sensor monitors the superheat in refrigerant at the compressor inlet.

In certain embodiments, the sensor initiates the cold start mode when the superheating value is at least 10 Kelvin. More specifically, the sensor is operably linked to a controller which is operable to initiate the cold start mode in the system. In the refrigerant management system according to the invention, the target refrigerant vapour quality is 85 to 90%. Without wishing to be bound by theory, the compressor is operable to start compressing refrigerant when the vapour quality is between 100% and 90%, therefore, in any of the heating and cooling modes of operation, the refrigerant management system monitors the superheat value of the refrigerant at the inlet of the compressor by a sensor and if that superheat value is at least 10 Kelvin, one of the cold start mode initiation criteria is fulfilled. The detection of superheated refrigerant at the inlet to the compressor means that the accumulator upstream of the compressor is dry and the compressor is in danger of damage or failure if operated.

In certain embodiments, a controller is operable to activate one of more of the valves in the system. More specifically, controller is operable to activate one of more of the valves in the air conditioning circuit.

In certain embodiments, the controller is operably linked to the sensors at the inlet to the compressor and at ambient. More specifically, the ambient is the ambient environment. Yet more specifically, the ambient is an ambient air heat source.

In certain embodiments, the system comprises at least one temperature sensor operable (arranged, adapted) to monitor the temperature of the refrigerant in each of the heating and the cooling circuits.

In certain embodiments, the coolant circuit from the evaporator is in thermal communication with a heat source. More specifically, the heat source is a powertrain. Yet more specifically, the powertrain is an electric vehicle powertrain.

According to a further aspect of the invention, there is provided a heat flux management system including the refrigerant management system according to the invention.

In certain embodiments, the heat flux management system comprises a refrigerant management system in which the heat pump circuit comprises at least one thermodynamic cycler thermally connected to a heat sink being one or more of a cabin and a battery.

According to a still further aspect of the invention, there is provided a vehicle including an engine and the heat flux management system according to the invention.

In certain embodiments, the engine is electrochemically powered.

According to another aspect of the invention, there is provided a method of refrigerant management in an electric vehicle, including providing a refrigerant management system according to the invention;

when the compressor is idle, sensing the temperature and pressure of the refrigerant at the compressor inlet with at least one sensor;

initiating the cold start mode if the sensor detects one or both of: a superheated refrigerant at the compressor inlet and a temperature gradient of more than 3 Kelvin between ambient and the compressor inlet;

terminating the cold start mode and starting the heating mode or the cooling mode when the sensor detects one or both of: a non-superheated refrigerant at the compressor inlet and a temperature gradient equal to or less than 3 Kelvin between ambient and the compressor inlet.

In certain embodiments, the method comprises sensing the temperature at the ambient inlet to the heat pump condenser and in the fluid at the compressor inlet with at least one sensor.

In certain embodiments, upon initiation of the cold start mode the compressor is activated before the shut off valve is opened to allow reverse refrigerant flow from the heat pump condenser to the accumulator.

In certain embodiments, the cold start mode is initiated after a cooling mode.

In certain embodiments, the cold start mode is initiated after the compressor has been idle for a period of time and the preceding mode was a cooling mode.

In certain embodiments, the period of time for which the compressor is idle is more than 60 minutes.

Wherein referred to herein "vapour quality" is the mass fraction in a saturated mixture that is vapour, therefore saturated vapour has a "vapour quality" of 100%, and saturated liquid has a "vapour quality" of 0%.

Wherein referred to herein a thermodynamic cycler if a component of a system which is operable to perform one or more of a series of thermodynamic processes (a thermodynamic cycle) which returns a system to its initial state.

When used herein, the terms "upstream" and "downstream" are the relative positions of one or more components relative to the fluid flow direction through the circuit in which the component(s) are positioned in the cooling and in the heating modes of operation.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Figure 1:
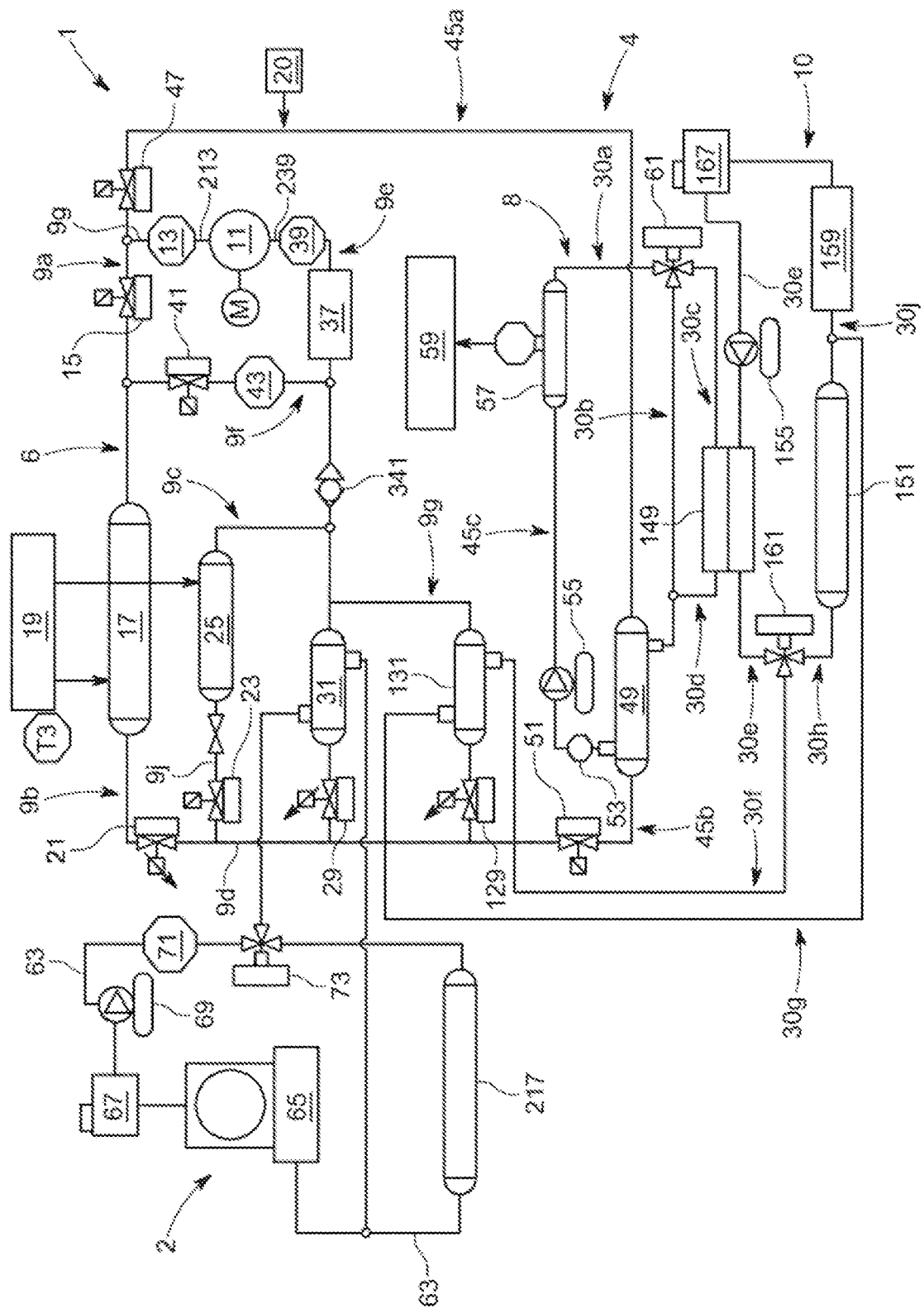
FIG. 1 is a schematic diagram of a heat flux management system for an electric vehicle according to an embodiment of the invention.

Wherever possible, like reference numerals are used to depict similar features throughout.

As shown in FIG. 1, the heat flux management system 1 for an electric vehicle 150 (see FIG. 6) comprises a refrigeration cycle refrigerant circuit 6 and a heat pump circuit 4. The components are indicated in the flow path of a fluid during operation within the respective circuits. When used herein "upstream" and "downstream" relate to the direction in which fluid will flow in the system.

In FIG. 1, the refrigeration cycle refrigerant circuit 6 comprises a refrigerant line 9a arranged to fluidly connect the compressor 11, a pressure and temperature sensor 13 and a shut-off valve 15 to an external air-refrigerant heat exchanger 17 operable as a heat pump condenser and thermally connected to a heat source, being ambient air 19; a second refrigerant line 9b arranged to fluidly connect the external heat exchanger 17 operable as a heat pump condenser and an expansion valve 21 associated with the external heat exchanger 17; and a further refrigerant line 9f arranged to fluidly connect external heat exchanger 17, shut off valve 41, temperature and pressure sensor 43 and accumulator 37. Expansion valve 21 associated with heat pump condenser 17 is fluidly connected to the evaporator/dehumidifier 25 through associated valve 23 and line 9j. Evaporator/dehumidifier 25 is fluidly connected to the accumulator 37 via refrigerant line 9c via cut off valve 341.

The heat pump circuit 4 comprises refrigerant lines 45b, 9d and 9j arranged to fluidly connect a evaporator/dehumidifier 25 which receives heat from ambient air 19 and associated shut-off valve 23 with indirect condenser 49 and associated shut off valve 51. The evaporator/dehumidifier 25 is in fluid communication with accumulator 37 via refrigerant line 9c via cut off valve 341. Refrigerant line 9d fluidly connects the shut-off valve 23 and expansion valve 29 associated with an evaporator 31 and line 45b fluidly connects indirect condenser 49 with evaporator 31 via associated valves 51 and 29 respectively. Refrigerant line 9e fluidly connects the accumulator 37 with the compressor 11 via compressor inlet 239 in which temperature and pressure sensor 39 is located to monitor the parameters of the refrigerant at the compressor inlet 239.

The heat pump circuit 4 comprises a refrigerant line 9g which is arranged to fluidly connect the outlet (213) of the compressor (11) and shut off valve 47 which is in its open position in the heat pump circuit 4. A pressure and temperature sensor 13 monitors the fluid exiting the compressor outlet 213. Refrigerant line 45a is arranged to fluidly connect the open shut-off valve 47 and an internal refrigerant to coolant heat exchanger, indirect condenser 49. The indirect condenser 49 is fluidly connected to the valves 23 and 29 associated with the evaporator/dehumidifier 25 and the evaporator 31 through shut off valve 51 in refrigerant line 45b. The evaporator/dehumidifier 25 and the evaporator 31 are each fluidly connected to the accumulator 37 via cut off valve 341 in the heating mode when associated valves 51, 23, 29, 341 are open. The accumulator 37 is fluidly connected to the inlet (239) of the compressor (11) and pressure and temperature sensor 39 is associated with the suction side of the compressor 11 and is operable monitors the fluid in line 9e at the inlet (239) of the compressor. The refrigeration lines allow the flow of refrigerant therethrough.

The heat pump circuit 4 comprises a coolant circuit 8 in which line 45c is arranged to fluidly connect a coolant side of the indirect condenser 49, a temperature sensor 53, a heat pump 55 and a second internal coolant to air heat exchanger 57 thermally coupled to a heat sink, being passenger cabin 59. A three-way valve 61 downstream of heat exchanger 57 is operable to direct coolant flow back to the indirect condenser 49 via line 30b or, in a second position, to direct coolant flow to both the indirect condenser 49 via line 30b and to coolant circuit 10 via line 30c in which the coolant is directed to a heat exchanger 149 from which coolant flows via lines 30e and valve 161 with which heat exchanger 149 is fluidly coupled, via line 30h to a further heat exchanger 151 and via line 30j to a second heat sink 159, being a traction battery of an electric vehicle. Coolant in coolant circuit 10 is returned to heat exchanger 149 via line 30e an expansion header tank 167 and pump 155.

In coolant circuit 10, three-way valve 161, in a second position, fluidly connects heat exchanger 149 with a coolant-refrigerant heat exchanger 131 via line 30f which can be fluidly connected at its refrigerant side to the heat pump circuit 4 (i.e. accumulator 37) when associated valve 129 is open. The coolant side of heat exchange 131 is fluidly connected to the battery 159.

The components of the heat pump circuit 4 are connected by means of refrigerant pipes 9, 30, 45 which, in use, allow the flow of refrigerant through the circuit 4.

Still referring to FIG. 1, the vehicle heat flux management system 1 comprises an additional coolant circuit 2 including a heat source being a powertrain 65, fluidly connected to an expansion header tank 67 and a pump 69 via lines 63. Three way valve 73 is operable to switch coolant circuit 2 into fluid communication with heat pump circuit 4 via the coolant side of evaporator 31. Line 63 comprises a temperature sensor 71 to monitor the temperature of the powertrain 65 and the coolant in lines 63.

Three way valve 73 is operable to switch coolant circuit 2 into fluid communication with heat exchanger 217 when the coolant circuit is to be isolated from fluid communication with the heat pump circuit 4.

The compressor 11 is fluidly coupled to each of the refrigeration cycle refrigerant circuit 6 and the heat pump circuit 4 by the shut-off valve 15 and the shut-off valve 47 respectively. Each of valves 15 and 47 are downstream from the compressor 11. The mode of operation for the vehicle heat flux management system 1 and, more specifically, the refrigerant management system 100, can be changed from a heating mode to a cooling mode depending on the direction of refrigerant flow downstream from the compressor 11 high pressure side into one of these shut-off valves 15, 47 respectively. In the cooling mode, valve 47 is closed and valve 15 is open, thereby directing refrigerant from the compressor outlet 213 to the heat pump condenser 17. In the heating mode, valve 15 is closed and valve 47 is open thereby directing refrigerant from the compressor outlet 213 to the heat pump circuit 4 and the indirect condenser 49.

Figure 2:
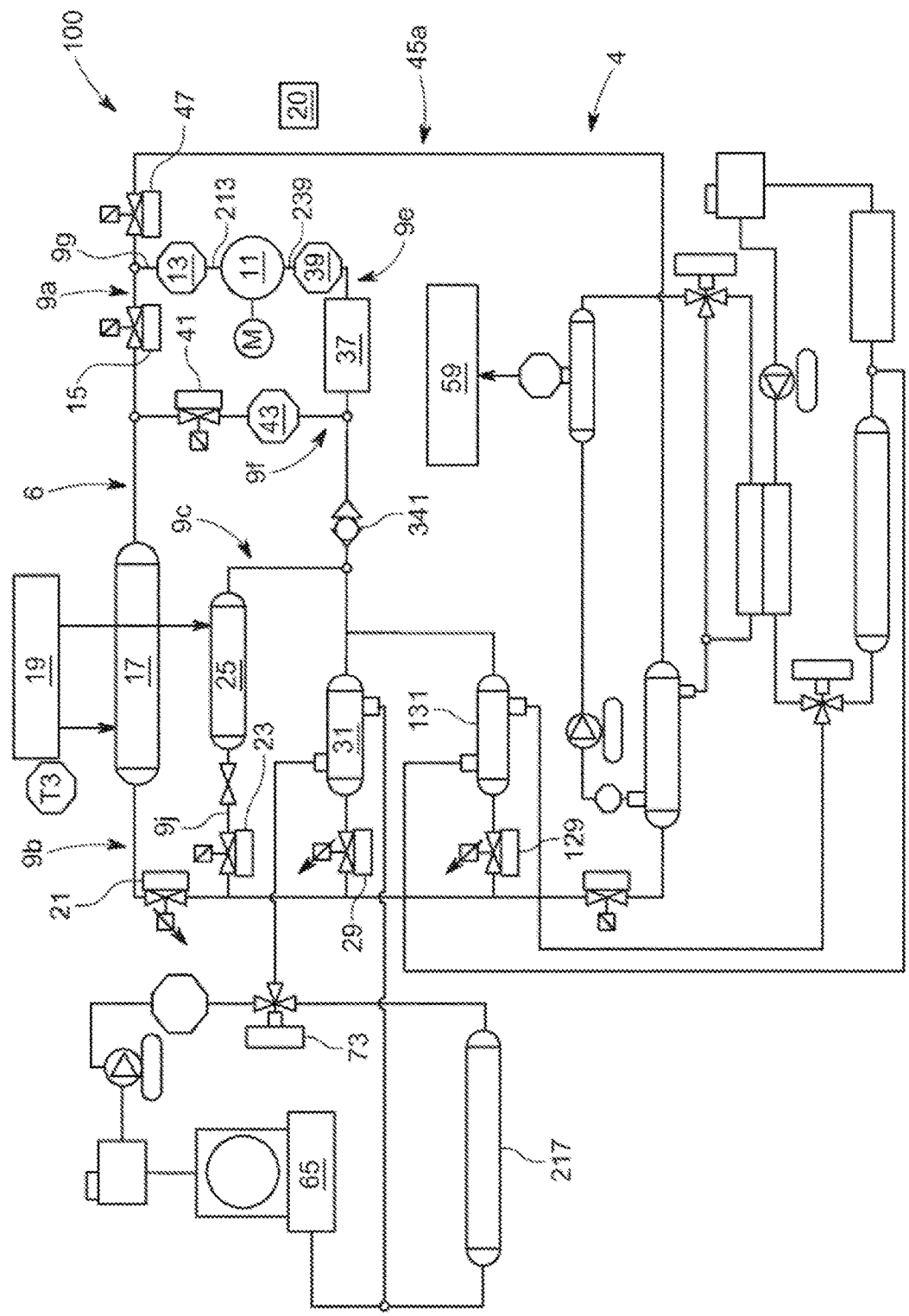
FIG. 2 is a schematic diagram of a refrigerant management system according to an embodiment of the invention operable in a cooling mode.

As shown in FIG. 2, a refrigerant management system 100 is switched into a cooling mode by controller 20 linked to the vehicle central management system (not shown).

In the Figures, the controller 20 is operably connected to the systems 1, 100 and the components thereof. For the sake of clarity, the connections between the controller 20 and the components of the systems 1, 100 are not shown.

In the cooling mode, the external air-refrigerant heat exchanger functioning as a condenser 17 is in fluid communication with the compressor 11 via lines 9a, 9b, 9c, 9j, 9g and 9f when expansion valve 21, shut off valve 41 and shut off valve 15 are in the open position. The heat pump circuit valves 47, 51, 29, are closed. Refrigerant is no longer directed to indirect condenser 49 through line 45a because shut off valve 47 is closed. Valve 23 is open in the cooling mode and the refrigeration cycle refrigerant circuit 6 and condenser 17 is in fluid communication with the compressor 11 through the evaporator/dehumidifier 25 and the accumulator 37. Valve 73 in the coolant circuit 2 is in a position to direct coolant to heat exchanger 217 within the coolant circuit 2. In this way, the coolant circuit 2 is isolated from the refrigeration cycle refrigerant circuit 6. In the cooling mode, the heat energy from the vehicle passenger cabin 25 is transferred exteriorly through the flow of refrigerant into the external heat exchangers 17, 25 which are each thermally coupled to the external ambient air 19 in the refrigeration line 9b and the refrigeration line 9c. This heat removal to the external ambient air 19 allows heat to flow from the internal cabin 59 side of the vehicle to the refrigeration cycle refrigerant circuit 6.

In operation of the refrigeration cycle refrigerant circuit 6 in the cooling mode of the refrigerant management system 100, refrigerant in a state of low temperature and low pressure is drawn into the inlet 239 of the compressor 11 which is operable to transform the refrigerant into a high temperature, high pressure gas at the outlet 213 of the compressor 11. The temperature and pressure at the compressor 11 outlet is monitored by the pressure and temperature sensor 13. The refrigerant then flows in the refrigeration line 9a, through open shut off valve 15 into the external heat exchanger 17, acting as a condenser, which transfers the heat energy to the thermally coupled ambient air 19, removing heat from the system 1, which simultaneously causes the refrigerant to condense into a liquid state. The liquid refrigerant then reaches the expansion valve 21 associated with the condenser 17 through line 9b where flow is directed towards open shut off valve 23, through refrigeration line 9j and into evaporator/dehumidifier 25. Downstream of the evaporator/dehumidifier 25, the refrigerant flows through line 9c to open cut off valve 341 and into accumulator 37. Evaporator/dehumidifier 25 is thermally coupled to ambient air 19 and is operable to further remove heat from the system 100 before the refrigerant is directed to the refrigerant accumulator 37, which acts as a collector of refrigerant for supplying to the compressor 11 suction side, where a pressure and temperature sensor 39 is located. The refrigeration cycle refrigerant circuit 6 is operable to allow for refrigerant to flow downstream from the first shut-off valve 15 in the refrigeration line 9a into the refrigeration line 9f through the shut-off valve 41 into the pressure and temperature sensor 43 before being collected in the accumulator 37. In the cooling mode of system 100, valve 47 in the heating circuit is closed thereby isolating the heat pump circuit 4 from the outlet 213 of the compressor 11.

Figure 3:
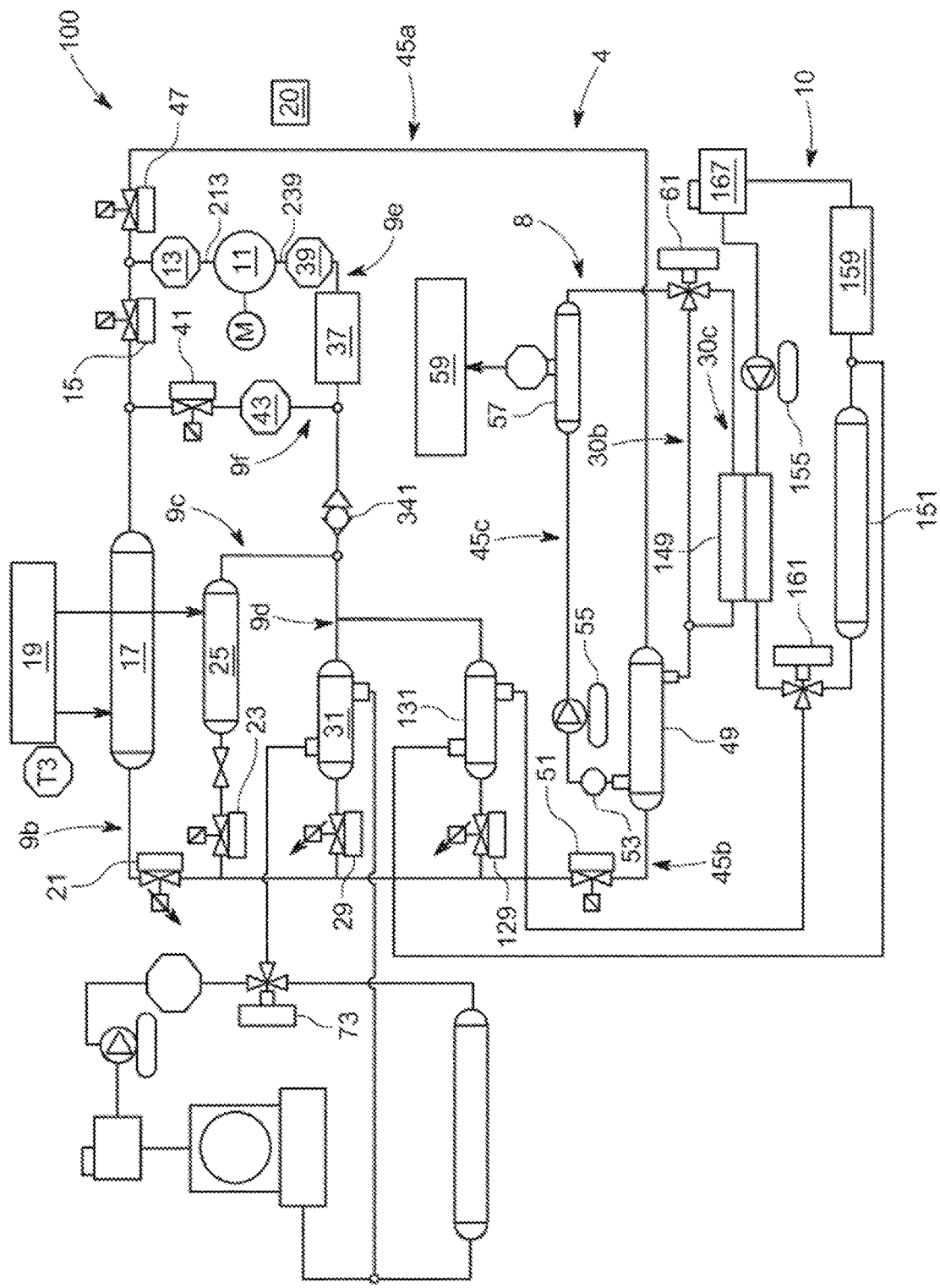
FIG. 3 is a schematic diagram of a refrigerant management system according to an embodiment of the invention operable in a heating mode.

As shown in FIG. 3, the vehicle heat flux management system 1 and specifically the refrigerant management system 100 is operable in a heat pump mode of operation by closing the shut-off valve 15 in the refrigeration line 9a and opening the shut-off valve 47 in the heat pump line 45a thereby switching the compressor 11 from fluid communication with the heat pump condenser 17 in the refrigeration cycle refrigerant circuit 6 into fluid communication with the indirect condenser 49 in the heat pump circuit 4. In this way, the heating mode of the air conditioning circuit is initiated. By closing the shut-off valve 41 in the refrigeration line 9f, and closing the expansion valve 21 in the refrigeration line 9b, the heat pump condenser 17 is fluidly isolated from the compressor both at its outlet 213 and its inlet 239.

By closing the shut-off valve 15 and opening the shut-off valve 47, the refrigerant downstream from the compressor 11 outlet is directed into the heat pump circuit 4 rather than the refrigeration cycle refrigerant circuit 6 of the air conditioning system in the refrigerant management system 1. Closing the shut-off valve 41 in refrigeration line 9f and the expansion valve 21 in the refrigeration line 9b disengages the external heat exchanger 17 from the system. In this heating mode, hot pressurised refrigerant gas flows downstream from the outlet 213 of the compressor 11 into the heat pump coolant circuit 8 via line 45a and indirect condenser 49. Line 45c transfers coolant to air-coolant heat exchanger 57, transferring heat energy to the internal cabin 59 through the thermal coupling between the cabin 59 and the internal heat exchanger 57 acting as a condenser. Coolant is returned to indirect condenser 49 through valve 61 and line 30b in coolant circuit 8.

Refrigerant is returned from the indirect condenser 49 to the evaporator/dehumidifier 25 and the evaporator 31 through open associated valves 51, 23 and 29 respectively. The heat pump circuit 4 is completed by refrigerant from evaporator/dehumidifier 25 and evaporator 31 flowing through cut off valve 341 into accumulator 37 and on to the inlet 239 of the compressor.

In the embodiments shown in FIGS. 2 and 3, the refrigeration cycle refrigerant circuit 6 and the heat pump circuit 4 require sufficient refrigerant for the compressor 11 to operate. If, for example, the heat flux management system 1 has been running in the refrigeration mode (see FIG. 2) when the vehicle stops, and while the system 1, 10 (and the vehicle) lies idle, the ambient temperature drops below that of the compressor 11 inlet (if the temperature differential between the compressor inlet and ambient is less than 3 Kelvin, i.e. the ambient is colder or less than 3 Kelvin warmer), the refrigerant will tend to be drawn towards and pool at the first external heat exchanger 17, which is the coldest part of the system. If the system has been left idle for prolonged periods of time, the refrigerant may leak from the refrigerant accumulator 37 into the first external heat exchanger 17 through the shut-off valve 41 in the refrigeration line 9f, the shut-off valve 15 in the refrigeration line 9a and the expansion valve 21 in the refrigeration line 9b. In such a case, the compressor 11 will have insufficient refrigerant to continue its operation and therefore risks failure. The undesired and adverse excess refrigerant at the first external heat exchanger 17 therefore needs to be transferred back to the accumulator 37. In addition, the sensor 39 may, under these conditions, detect a superheated refrigerant at the inlet 239 of the compressor meaning that the accumulator 37 is dry and contains insufficient refrigerant to run the compressor 11 when it starts.

Figure 4:
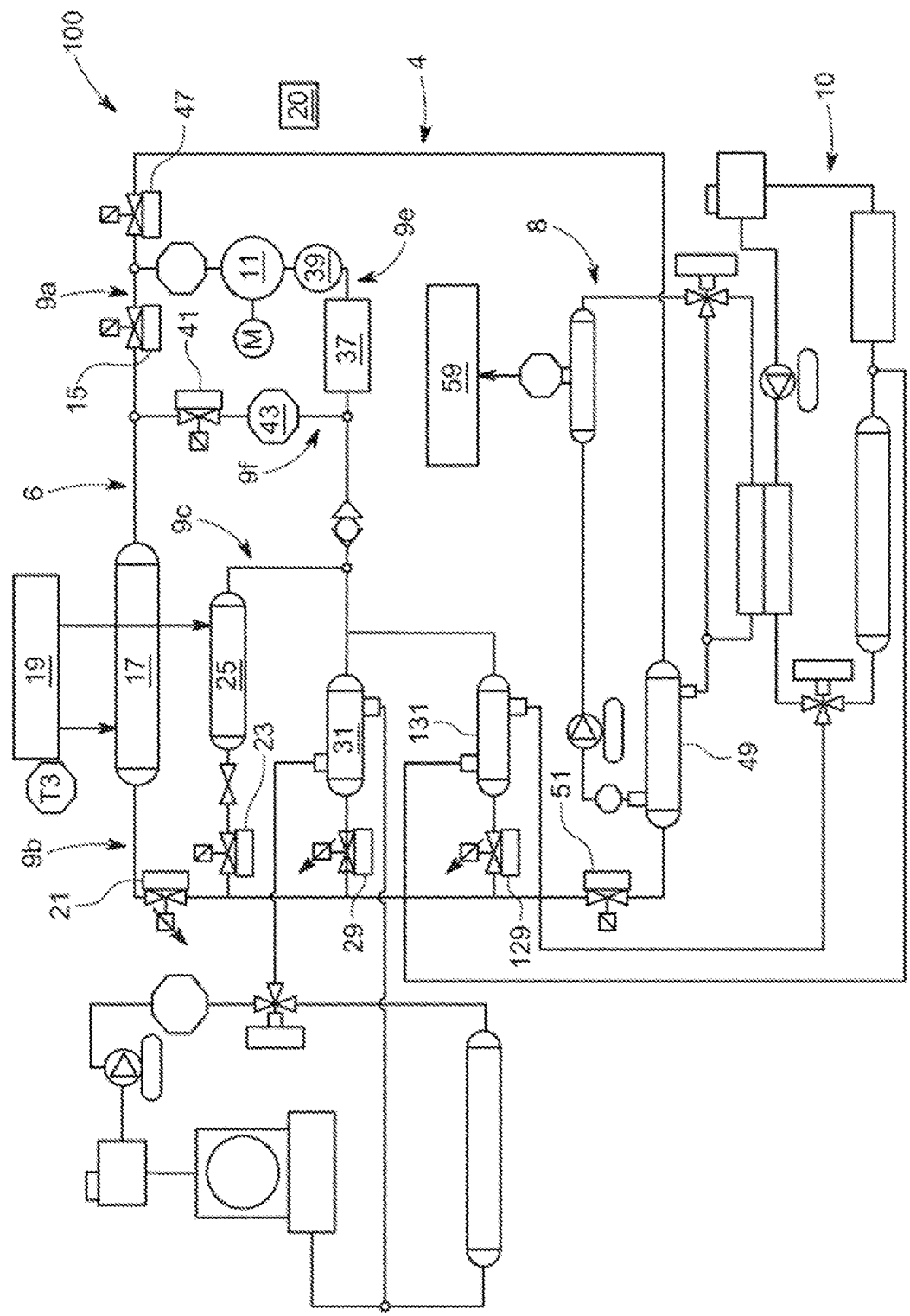
FIG. 4 is a schematic diagram of a refrigerant management system according to a yet further embodiment of the invention operable in a cold start mode.

The system 100 is operable to run a cold start mode as shown in FIG. 4. In the cold start mode, the shut-off valve 41 in the refrigeration line 9f is operable to allow a temporary fluid communication between the first internal heat exchanger 17 and the accumulator 37, enabling the reverse flow of refrigerant from the first internal heat exchanger 17 back to the accumulator 37. A coupled system between the pressure and temperature sensor 39 located at the compressor 11 inlet and the pressure and temperature sensor 43 located at the external heat exchanger 17 determines if superheated refrigerant vapour exists at inlet 239 and that the refrigerant accumulator 37 is therefore dry. A coupled sensor system between sensor 39 and sensor T3 at the ambient air heat source 19 determines whether a temperature gradient surplus of 3 Kelvin or more exists between the compressor 11 and the heat pump condenser 17. The refrigerant management system 100 is operable to initiate the start-up mode if one or both of the conditions are detected: a superheated refrigerant vapour and a temperature gradient surplus of −3 Kelvin between the compressor 11 inlet and the first internal heat exchanger 17. When these conditions are met, the shut-off valve 41 is operable to open to initiate a cold start mode. In this mode, the compressor 11 is activated to allow the flow of refrigerant from the first internal heat exchanger 17 through the shut-off valve 41 in the refrigeration line 9*f* back into the refrigerant accumulator 37. This allows sufficient refrigerant for the compressor 11 to continue its operation, after this cold start mode, in either the refrigeration mode (FIG. 2) or the heating mode (FIG. 3). In the cold start mode of FIG. 4, valves 21 and 15 remain/are closed. In this way, the heat pump condenser 17 is isolated from the remaining components of the refrigeration cycle refrigerant circuit 6 and from the heat pump circuit 4.

Figure 5:
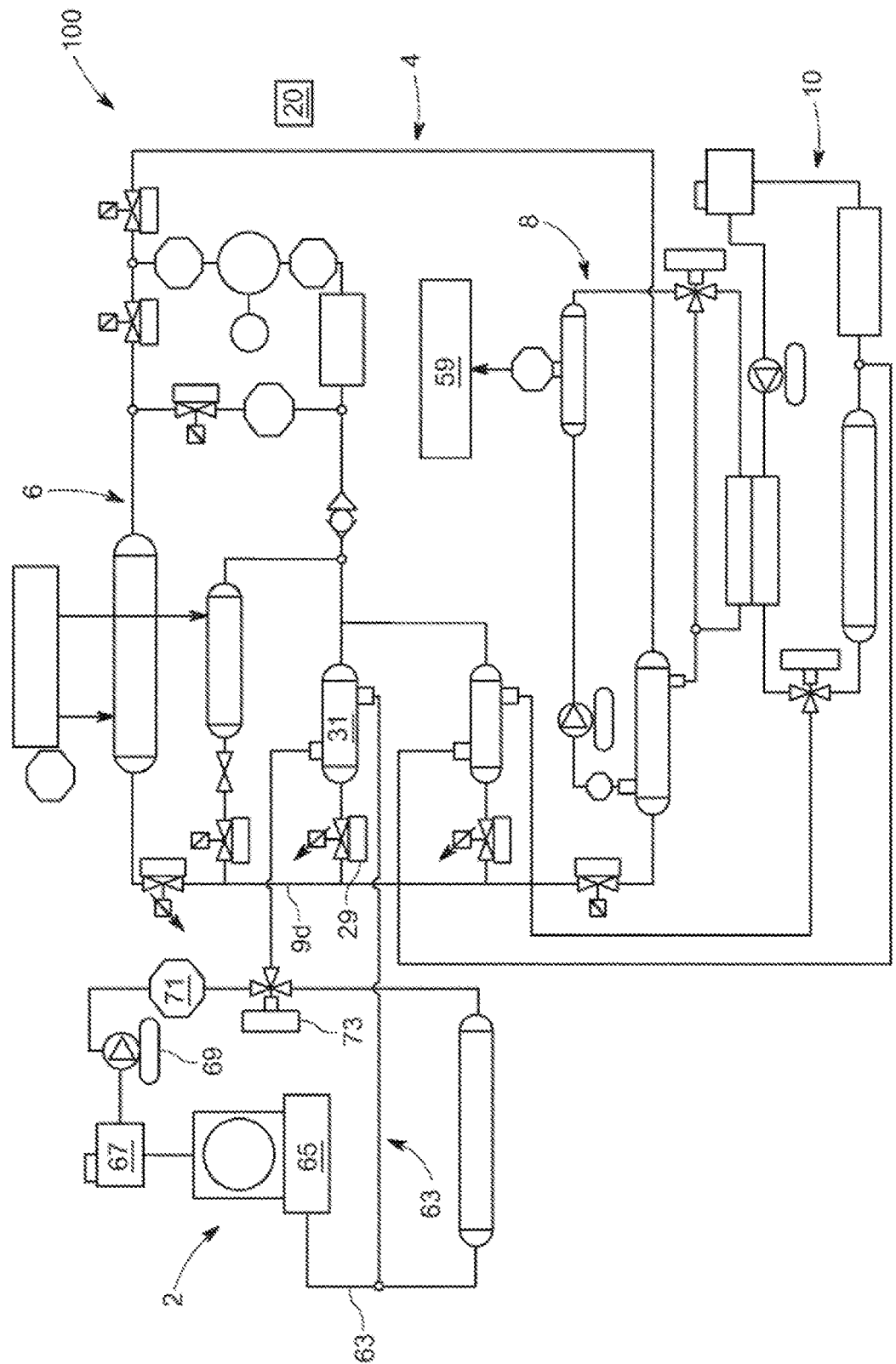
FIG. 5 is a schematic diagram of the vehicle heat flux management system of FIG. 1 according to a further embodiment of the invention including an additional heat source circuit.

As shown in FIG. 5, an additional coolant circuit 2 comprises a low grade heat energy source, powertrain 65, and the coolant side of evaporator 31, thereby providing the coolant circuit 2 with fluid connection with the heat pump circuit 4 and the heating mode. By passing coolant fluid through another heat source (e.g. power train 65) the evaporator 31 collects further low grade heat into the heat pump circuit 4. Within evaporator 31 refrigerant flow is thermally coupled to that coolant circuit 2 and is directed downstream to the accumulator 37 and on to the compressor 11 inlet 239. In the coolant circuit 2, coolant flows downstream from the evaporator 31 and is thermally coupled to a heat energy source 65. Temperature sensor 71 is located so as to monitor the coolant temperature in circuit 2. An expansion header tank 67 and a heat pump 69 are included in the circuit 2 to allow the refrigerant to flow. This thermal coupling between the evaporator 31 and the additional thermal circuit 2 is made by actuating the associated valve 73 to provide fluid communication between the coolant circuit 2 and the evaporator 31 of the heat pump circuit 4.

In each of the circuits of FIGS. 1 to 5, the controller 20 can be a controller, a control unit or a module such as a programmable CPU, which is operable to switch the refrigerant management system 100 between any one of a number of modes. The controller 20 may be the vehicle central management system processor.

Figure 6:
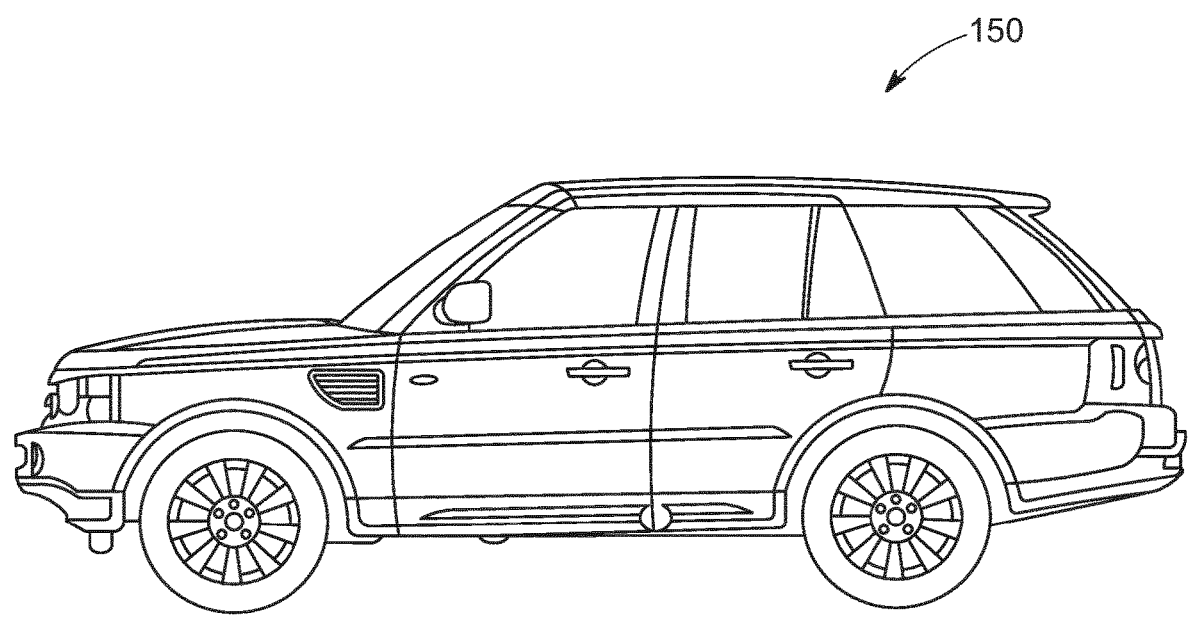
FIG. 6 shows an electric vehicle including the heat flux management system of FIG. 1

FIG. 6 shows an electric vehicle 150 including a heat flux management system 1 including a refrigerant management system 100 of the invention. The central management system (not shown) of the vehicle is operably linked to the controller 20 of the system 1.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program including code for implementing a system or method as described herein and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A refrigerant management system in a heat flux management system for an electric vehicle, the refrigerant management system comprising a vehicle air conditioning circuit comprising a heat pump circuit with a heating function and a refrigeration cycle refrigerant circuit, the air conditioning circuit comprising a heat pump condenser in thermal communication with a heat source, a refrigerant evaporator in thermal communication with the heat source, an evaporator associated with an expansion valve, and a refrigerant compressor, wherein the components are fluidly connected to one another by a refrigerant line, an accumulator fluidly coupled in the refrigerant line downstream of the heat pump condenser, the refrigerant evaporator and evaporator and upstream of the refrigerant compressor, the heat pump circuit comprising an indirect condenser downstream of the refrigerant compressor and in thermal communication with a heat sink and the refrigerant evaporator and the evaporator in fluid communication with the refrigerant compressor and the indirect condenser;

the refrigeration cycle refrigerant circuit comprising the heat pump condenser in fluid communication with the compressor;

wherein the air conditioning circuit is switchable between a heating mode in which the heat pump circuit is in fluid communication with the compressor and the heat pump condenser is isolated from fluid communication with the compressor and a cooling mode wherein the refrigerant circuit is in fluid communication with the compressor by actuation of at least one valve;

wherein the air conditioning circuit comprises a sensor at the compressor inlet operable to monitor refrigerant temperature and pressure; and wherein when the system is in the heating mode, a shut off valve in line between the heat pump condenser and the accumulator is operable to open to initiate a cold start mode in which a temporary fluid communication is provided between the heat pump condenser and the accumulator in the heat pump circuit when:

the sensor detects one or both of: a superheated refrigerant at the compressor inlet and a temperature gradient of more than 3 Kelvin between the ambient temperature and the temperature at the compressor inlet.

2. The refrigerant management system according to claim 1, wherein each of the heat pump condenser, the refrigerant evaporator and the evaporator are each associated with at least one valve.

3. The refrigerant management system according to claim 1, wherein the compressor is associated with at least one valve.

4. The refrigerant management system according to claim 3, wherein the at least one valve is associated with the outlet of the compressor and is operable to switch the outlet of the compressor into fluid communication with the heat pump circuit or the refrigeration cycle refrigerant circuit in the heating mode or the cooling mode respectively.

5. The refrigerant management system according to claim 4, wherein the at least one valve associated with the compressor and at least one valve associated with the heat pump condenser are operable to switch the system from the heating mode to the cooling mode.

6. The refrigerant management system according to claim 1, wherein in the heating mode the heat pump condenser is fluidly isolated from the compressor by actuation of at least two valves.

7. The refrigerant management system according to claim 6, wherein in the heating mode the heat pump condenser is fluidly isolated from the compressor by closure of at least two valves one valve associated with the inlet and one valve associated with the outlet of the heat pump condenser.

8. The refrigerant management system according to claim 1, wherein in the heating mode, the heat pump condenser is fluidly isolated from the inlet and the outlet of the compressor and/or the heat pump condenser is fluidly isolated from the refrigerant evaporator, the evaporator, and the refrigerant compressor, and/or the heat pump condenser is isolated from the outlet of the compressor by closing a shut off valve and from refrigerant evaporator and the evaporator by closing an associated expansion valve and from the accumulator by closing the shut off valve, and/or the heat pump condenser is isolated from the heat pump circuit by closing at least one valve at the outlet of the compressor.

9. The refrigerant management system according to claim 1, wherein in the cooling mode, the heat pump condenser is in fluid communication with the compressor, and/or the heat pump condenser is in fluid communication with the outlet of the compressor, the accumulator and with the refrigerant evaporator by actuation of a plurality of associated valves.

10. The refrigerant management system according to claim 1, wherein the shut off valve in line between the heat pump condenser and the accumulator is closed in the cold start mode when the sensor detects one or both of: a non-superheated refrigerant at the compressor inlet and a temperature gradient equal to or less than 3 Kelvin between ambient and the compressor inlet.

11. The refrigerant management system according to claim 1, wherein the cold start mode is available prior to initiation of the heating mode.

12. The refrigerant management system according to claim 1, wherein the compressor is operable to draw a reverse flow of refrigerant from the heat pump condenser to the accumulator in the cold start mode.

13. The refrigerant management system according to claim 1, wherein the sensor monitors the superheat in refrigerant at the compressor inlet.

14. The refrigerant management system according to claim 13, wherein the sensor initiates the cold start mode when a superheat value is at least 10 Kelvin.

15. A vehicle comprising an engine and the refrigerant management system according to claim 1.

16. The vehicle according to claim 15, wherein the heat pump circuit comprises at least one thermodynamic cycler thermally connected to at least one of a cabin and a battery, wherein the cabin and battery are operable to remove heat.

17. The vehicle according to claim 15, wherein the engine is electrochemically powered.

18. A method of refrigerant management in an electric vehicle, comprising:
  a. providing the refrigerant management system according to claim 1;
  b. when the compressor is idle, sensing the temperature and pressure of the refrigerant at the compressor inlet with at least one sensor;
  c. initiating the cold start mode if the sensor detects one or both of: a superheated refrigerant at the compressor inlet and a temperature gradient of more than 3 Kelvin between the ambient temperature and the temperature at the compressor inlet;
  d. terminating the cold start mode and starting the heating mode or the cooling mode when the sensor detects one or both of: a non-superheated refrigerant at the compressor inlet and a temperature gradient equal to or less than 3 Kelvin between the ambient temperature and the temperature at the compressor inlet.

19. The method according to claim 18, wherein upon initiation of the cold start mode the compressor is activated before the shut off valve is opened to allow reverse refrigerant flow from the heat pump condenser to the accumulator.

* * * * *